May 26, 1931. K. STROBEL 1,806,958
METHOD OF ELECTRIC ARC WELDING
Filed June 3, 1929
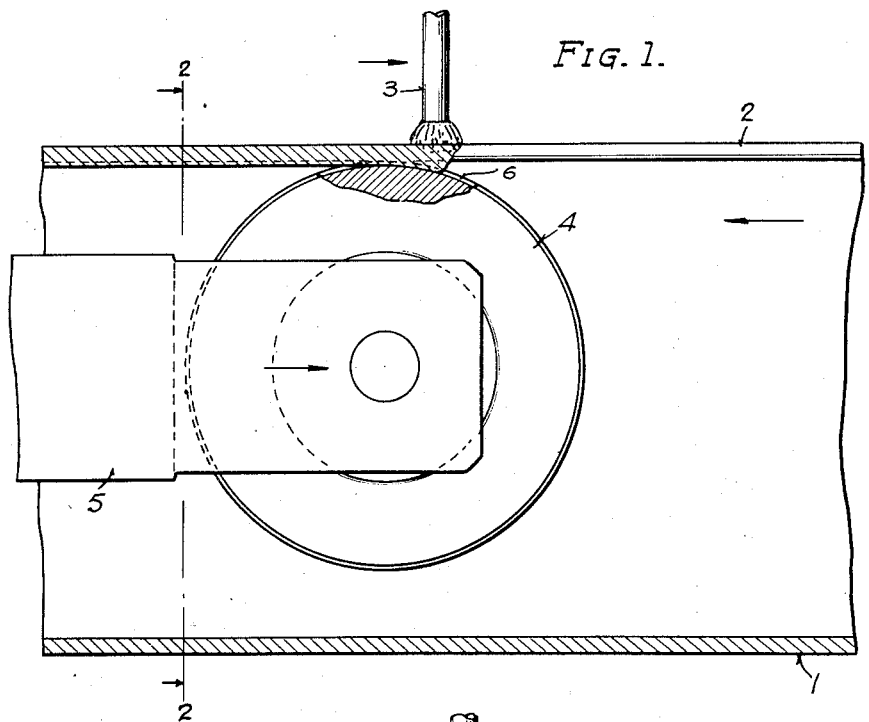
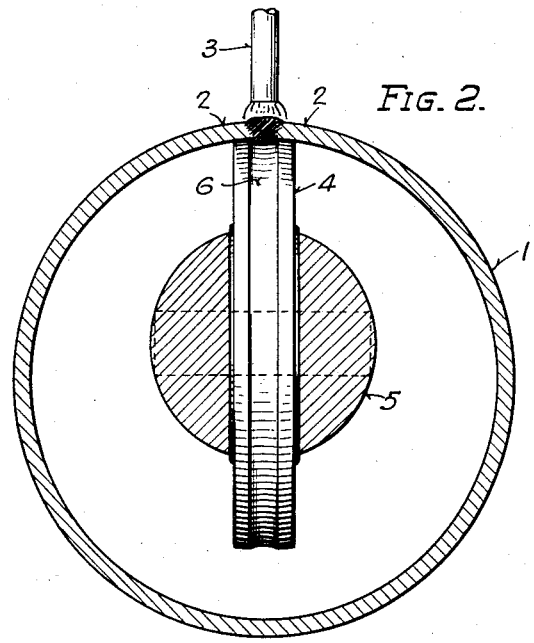
INVENTOR.
Karl Strobel
BY
ATTORNEY.

Patented May 26, 1931

1,806,958

UNITED STATES PATENT OFFICE

KARL STROBEL, OF MILWAUKEE, WISCONSIN, ASSIGNOR TO A. O. SMITH CORPORATION, OF MILWAUKEE, WISCONSIN, A CORPORATION OF NEW YORK

METHOD OF ELECTRIC ARC WELDING

Application filed June 3, 1929. Serial No. 368,087.

This invention relates to a method of electric arc welding and particularly to the welding of sheet metal wherein the penetration of the welding heat is of importance in obtaining a uniformly welded product.

The object of the invention is to provide a method whereby the penetration of the welding heat may be controlled in a manner providing for complete penetration through the metal to be welded.

Another object is to provide a method of electric arc welding sheet metal which will provide a better and more uniform weld.

The invention has been specifically applied to the manufacture of sheet metal pipe wherein a metal sheet is converted into tubular form with the side edges thereof meeting on a longitudinal line, and these edges are fused and welded together by the passage of an electric arc therealong, the arc serving to deposit welding metal between the edges from a fusible metallic weldrod.

The accompanying drawings illustrate this application of the invention and the views therein are as follows:

Figure 1 is a longitudinal sectional view of a pipe illustrating the welding operation.

Fig. 2 is a section on line 2—2 of Figure 1.

The pipe 1 is preferably formed from a sheet metal blank which is converted by bending or rolling into tubular form with the side edges 2—2 thereof meeting on a longitudinal line.

The edges are preferably scarfed as shown in Fig. 2 to provide a welding groove therebetween for the reception of deposited welding metal.

The welding apparatus includes a weldrod 3 which is suitably connected to the source of electrical energy and which may be secured in an automatic welding head adapted to feed the weldrod to the welding arc at an appropriate rate.

The apparatus further includes a chill 4 which is in the form of a roller arranged on the end of a supporting arm 5 adapted to be inserted within the pipe and to travel relatively therealong with the weldrod. The chill 4 is composed of any suitable material such as copper and is preferably cooled by a flow of water therethrough.

It has been found that where the chill is positioned directly underneath the arc the cooling action thereof is so great that the lower part of the edges to be welded does not reach the welding temperature and that the penetration of the welding heat or arc is non-uniform.

In the present invention the chill is positioned at an adjustable distance behind the arc to control the penetration of the welding heat and to obtain the desired uniform welding of the edges. It has been found preferable, as illustrated in Figure 1, to position the chill so that its axis is approximately from one to four or five inches, depending upon the diameter of the chill, behind a vertical line passing through the center of the arc. If the chill is placed too great a distance behind the arc, there is likely to be too great a penetration of the welding heat, which may melt the metal of the edges and burn a hole therethrough. If the chill is placed too near to the arc, it will prevent the proper penetration of the welding heat through the edges. By properly adjusting the position of the chill with respect to the arc, a uniform and complete penetration of the welding heat through the edges is obtained.

Since the chill follows the arc at a predetermined distance, the soft welding metal which is protruded on the under side of the weld by the penetration of the welding heat through the edges, as shown in Figure 1, is rolled and compressed back into the line of the weld by means of the chill.

The chill preferably has a peripheral groove 6 therein, as clearly shown in Fig. 2, which functions to desirably shape the under side of the weld. However, the periphery of the chill may be substantially flat or round in case it is desired to prevent the formation of a bead at the bottom of the weld.

I claim:

1. In electric arc welding the steps which comprise passing an electric arc along juxtaposed metal edges to heat the same to welding temperature and simultaneously therewith passing a chill in contact with the bottom of the metal being welded at a predetermined distance behind the arc and at substantially the same rate of speed as the travel of the arc to control the penetration of the welding heat through the metal.

2. The method of manufacturing electrically arc welded pipe which comprises converting a flat sheet of metal into tubular form with the side edges thereof in juxtaposed welding position, establishing an arc between said edges and a fusible metallic weldrod, traversing the edges with said arc to heat the same to welding temperature, and simultaneously therewith passing a roller chill underneath the edges and in contact therewith at a predetermined adjusted position behind the arc to control the penetration of the welding heat through the edges being welded.

In witness whereof I have signed my name at Milwaukee, Wisconsin, this 29th day of May, 1929.

KARL STROBEL.